SERIES CONNECTED TRANSISTOR AMPLIFIER
Filed July 20, 1954
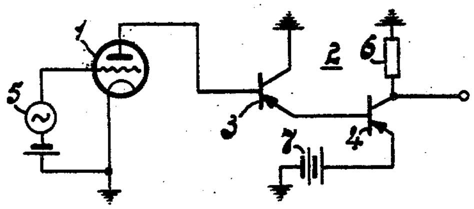
INVENTOR
ROOP NARAYAN MITAL
BY [signature]
AGENT 2,801,298
Patented July 30, 1957

2,801,298

SERIES CONNECTED TRANSISTOR AMPLIFIER

Roop Narayan Mital, Eindhoven, Netherlands, assignor, by mesne assignments, to North American Philips Company, Inc., New York, N. Y., a corporation of Delaware Application July 20, 1954, Serial No. 444,550

Claims priority, application Netherlands August 18, 1953

3 Claims. (Cl. 179—171)

The present invention relates to amplifier circuit arrangements. More particularly, the invention relates to amplifying cascades comprising the cascade of a first amplifier and a second amplifier which are fed from the same source of supply.

An object of the present invention is to achieve in a simple manner a high voltage amplification. For this purpose, and in accordance with the invention, the lead connecting the output electrode of the first amplifier to one terminal of the source of supply traverses successively the base-emitter path of a first transistor having a grounded collector and the base-emitter path of a second transistor having the output impedance in the collector circuit. The term "grounded collector" is to be understood in this case to mean that the collector is connected by way of a comparatively low impedance to a point of constant potential.

The first amplifier preferably comprises an electron tube, the lead connecting the anode of the tube to the base of the first transistor and also the lead connecting the emitter of the first transistor to the base of the second transistor being at floating potential. The term "floating potential" is to be understood in this case to mean that no other impedances connect the said leads to other points of the circuit.

In order that the invention may be readily carried into effect, it will now be described with reference to the accompanying drawing, wherein the single figure is a schematic diagram of a preferred embodiment of the circuit arrangement of the present invention.

The circuit of the figure comprises the cascade of a first amplifier 1, more particularly an electron tube amplifier, and a second amplifier 2 comprising two junction transistors 3 and 4. A source 5 of signals to be amplified is included in the grid circuit of amplifying tube 1, the amplified signals being produced across an output impedance 6. If desired, the tube 1 may operate additionally as a mixer of the signals with local generated oscillations (not shown).

According to the invention, the output electrode of the amplifier 1 is connected to one terminal of a supply source 7, which is common to the amplifiers 1 and 2, via a lead traversing successively the base-emitter paths of the transistors 3 and 4. The supply voltage available for the tube 1 is thus very little less than the voltage of the source 7, since the direct-voltage loss across the said base-emitter paths is only some tenths of a volt.

In order that a sufficiently high matching impedance may nevertheless be produced in the output circuit of the amplifying tube 1, the collector of transistor 3 is connected via a low impedance to ground, so that the said transistor, in addition, considerably assists in the amplification, while a matching transformer or blocking capacitors may be dispensed with.

The adjustment of the working points of the transistors 3 and 4 is fully determined by the adjustment of the grid of tube 1, the leads to the bases of the transistors 3 and 4 preferably being maintained at floating potential, since otherwise a decrease in the said matching impedance and a greater drift of the working points of the transistors 3 and 4 would result.

While the invention has been described by means of a specific example and in a specific embodiment, I do not wish to be limited thereto, for obvious modifications will occur to those skilled in the art without departing from the spirit and scope of the invention.

What is claimed is:

1. An amplifier comprising a signal amplifying device having an input electrode, a current carrying output electrode, and an electrode at a signal reference potential, first and second transistors each having an emitter electrode, a collector electrode and a base electrode, means for applying an input signal to said input electrode, means for directly connecting said output electrode to the base electrode of said first transistor, means for directly connecting the emitter electrode of said first transistor to the base electrode of said second transistor, low impedance means connecting the collector electrode of said first transistor to a point at said reference potential, a common source for energizing said amplifying device and said transistors having one terminal thereof connected to the emitter electrode of said second transistor and the other terminal thereof connected to a point at said reference potential, and an output load impedance connected from the collector electrode of said second transistor to a point at said reference potential.

2. An amplifier comprising a signal amplifying electron tube having a grid, a current carrying anode, and a cathode connected to a point at a signal reference potential, first and second transistors each having an emitter electrode, a collector electrode and a base electrode, means for applying an input signal to the grid of said electron tube, means for directly connecting the anode of said electron tube to the base electrode of said first transistor, means for directly connecting the emitter electrode of said first transistor to the base electrode of said second transistor, low impedance means connecting the collector electrode of said first transistor to said point of reference potential, a common source for energizing said electron tube and said transistors having one terminal thereof connected to the emitter electrode of said second transistor and the other terminal thereof connected to said point at reference potential, and an output load impedance connected from the collector electrode of said second transistor to a point at said reference potential.

3. An amplifier comprising an electron tube having a grid, a current carrying anode, and a cathode connected to a point at ground potential, first and second transistors each having an emitter electrode, a collector electrode and a base electrode, means for applying an input signal to the grid of said electron tube, means for directly connecting the anode of said electron tube to the base electrode of said first transistor, means for directly connecting the emitter electrode of said first transistor to the base electrode of said second transistor, low impedance means connecting the collector electrode of said first transistor to a point at ground potential, a common source for energizing said electron tube and said transistors having one terminal thereof connected to the emitter electrode of said second transistor and the other terminal thereof connected to a point at ground potential, and an output load impedance connected from the collector electrode of said second transistor to a point at ground potential.

References Cited in the file of this patent

UNITED STATES PATENTS

| | | |
|---|---|---|
| 1,986,597 | Nyman | Jan. 1, 1935 |
| 2,585,078 | Barney | Feb. 12, 1952 |
| 2,663,806 | Darlington | Dec. 22, 1953 |
| 2,666,817 | Raisbeck | Jan. 19, 1954 |
| 2,693,568 | Chase | Nov. 2, 1954 |